(12) United States Patent
Furio et al.

(10) Patent No.: US 9,109,921 B1
(45) Date of Patent: Aug. 18, 2015

(54) CONTEXTUAL BASED NAVIGATION ELEMENT

(71) Applicant: Amazon Technologies, Inc., Reno, NV (US)

(72) Inventors: Paul J. Furio, Seattle, WA (US); David Adam Edelstein, Seattle, WA (US); Scott Allen Dixon, Mercer Island, WA (US); Michael Christopher Wenneman, Seattle, WA (US); Robert King Myers, Santa Cruz, CA (US); Michael Zohar Podwal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 105 days.

(21) Appl. No.: 13/922,039

(22) Filed: Jun. 19, 2013

(51) Int. Cl.
*G01C 21/34* (2006.01)
*G01C 21/36* (2006.01)

(52) U.S. Cl.
CPC .................................... *G01C 21/367* (2013.01)

(58) Field of Classification Search
USPC ......................................................... 701/455
See application file for complete search history.

(56) References Cited

U.S. PATENT DOCUMENTS

| | | | |
|---|---|---|---|
| 6,321,158 B1 * | 11/2001 | DeLorme et al. | 701/426 |
| 8,099,108 B2 * | 1/2012 | Camp et al. | 455/456.3 |
| 8,311,727 B2 * | 11/2012 | Eckstein et al. | 701/532 |
| 8,456,297 B2 * | 6/2013 | van Os | 340/539.13 |
| 8,607,167 B2 * | 12/2013 | Matas et al. | 715/863 |
| 2004/0193371 A1 * | 9/2004 | Koshiji et al. | 701/211 |
| 2005/0188333 A1 * | 8/2005 | Hunleth et al. | 715/860 |
| 2008/0270886 A1 * | 10/2008 | Gossweiler et al. | 715/227 |
| 2009/0177385 A1 * | 7/2009 | Matas et al. | 701/209 |
| 2009/0303187 A1 * | 12/2009 | Pallakoff | 345/169 |
| 2009/0315766 A1 * | 12/2009 | Khosravy et al. | 342/357.07 |
| 2009/0319181 A1 * | 12/2009 | Khosravy et al. | 701/208 |
| 2010/0077361 A1 * | 3/2010 | Watkins | 715/863 |
| 2010/0088632 A1 * | 4/2010 | Knowles et al. | 715/784 |
| 2010/0094548 A1 * | 4/2010 | Tadman et al. | 701/209 |
| 2010/0138154 A1 * | 6/2010 | Kon et al. | 701/212 |
| 2010/0309149 A1 * | 12/2010 | Blumenberg et al. | 345/173 |
| 2011/0018827 A1 * | 1/2011 | Wang et al. | 345/173 |
| 2011/0115721 A1 * | 5/2011 | Li et al. | 345/173 |
| 2011/0163874 A1 * | 7/2011 | van Os | 340/539.13 |
| 2011/0304531 A1 * | 12/2011 | Brooks | 345/156 |
| 2012/0056837 A1 * | 3/2012 | Park et al. | 345/173 |
| 2012/0109516 A1 * | 5/2012 | Miyazaki et al. | 701/428 |
| 2012/0131519 A1 * | 5/2012 | Jitkoff | 715/863 |
| 2012/0184335 A1 * | 7/2012 | Kim et al. | 455/566 |
| 2012/0226977 A1 * | 9/2012 | Lengeling et al. | 715/702 |
| 2012/0316782 A1 * | 12/2012 | Sartipi et al. | 701/455 |

(Continued)

*Primary Examiner* — Calvin Cheung
(74) *Attorney, Agent, or Firm* — Novak Druce Connolly Bove + Quigg LLP

(57) ABSTRACT

Various embodiments enable a user to navigate within an application where features of the navigation vary depending on a context of the user or particular features of the application. For example, a user could request directions, in a turn-by-turn mode of the computing device, to a destination. Accordingly, mapping information for a region and a route to the destination through the region can be displayed. Along with the mapping information, a navigation element can be displayed that enables the user to navigate through the mapping information. In one example, the navigation element is displayed off-center from the mapping information such that it does not obscure the mapping information while the user provides touch inputs to navigate within the same.

20 Claims, 7 Drawing Sheets

(56) References Cited

U.S. PATENT DOCUMENTS

| | | | |
|---|---|---|---|
| 2012/0327125 A1* | 12/2012 | Kutliroff et al. | 345/660 |
| 2013/0100059 A1* | 4/2013 | Champion et al. | 345/173 |
| 2013/0120295 A1* | 5/2013 | Kim et al. | 345/173 |
| 2013/0162665 A1* | 6/2013 | Lynch | 345/589 |
| 2013/0181904 A1* | 7/2013 | Murase et al. | 345/168 |
| 2013/0185679 A1* | 7/2013 | Fretwell et al. | 715/862 |
| 2013/0197681 A1* | 8/2013 | Alberth et al. | 700/94 |
| 2013/0234948 A1* | 9/2013 | Jian | 345/169 |
| 2013/0271360 A1* | 10/2013 | MacDougall et al. | 345/156 |
| 2013/0321402 A1* | 12/2013 | Moore et al. | 345/419 |
| 2013/0321466 A1* | 12/2013 | Kocienda | 345/635 |
| 2013/0321472 A1* | 12/2013 | Piemonte et al. | 345/672 |
| 2013/0325319 A1* | 12/2013 | Moore et al. | 701/412 |
| 2013/0325341 A1* | 12/2013 | van Os et al. | 701/533 |
| 2013/0326407 A1* | 12/2013 | van Os et al. | 715/810 |
| 2013/0326425 A1* | 12/2013 | Forstall et al. | 715/851 |
| 2014/0104195 A1* | 4/2014 | Davidson | 345/173 |
| 2014/0215330 A1* | 7/2014 | Lee | 715/703 |
| 2014/0267094 A1* | 9/2014 | Hwang et al. | 345/173 |
| 2014/0365934 A1* | 12/2014 | Moore et al. | 715/769 |
| 2014/0365935 A1* | 12/2014 | Moha et al. | 715/769 |

* cited by examiner

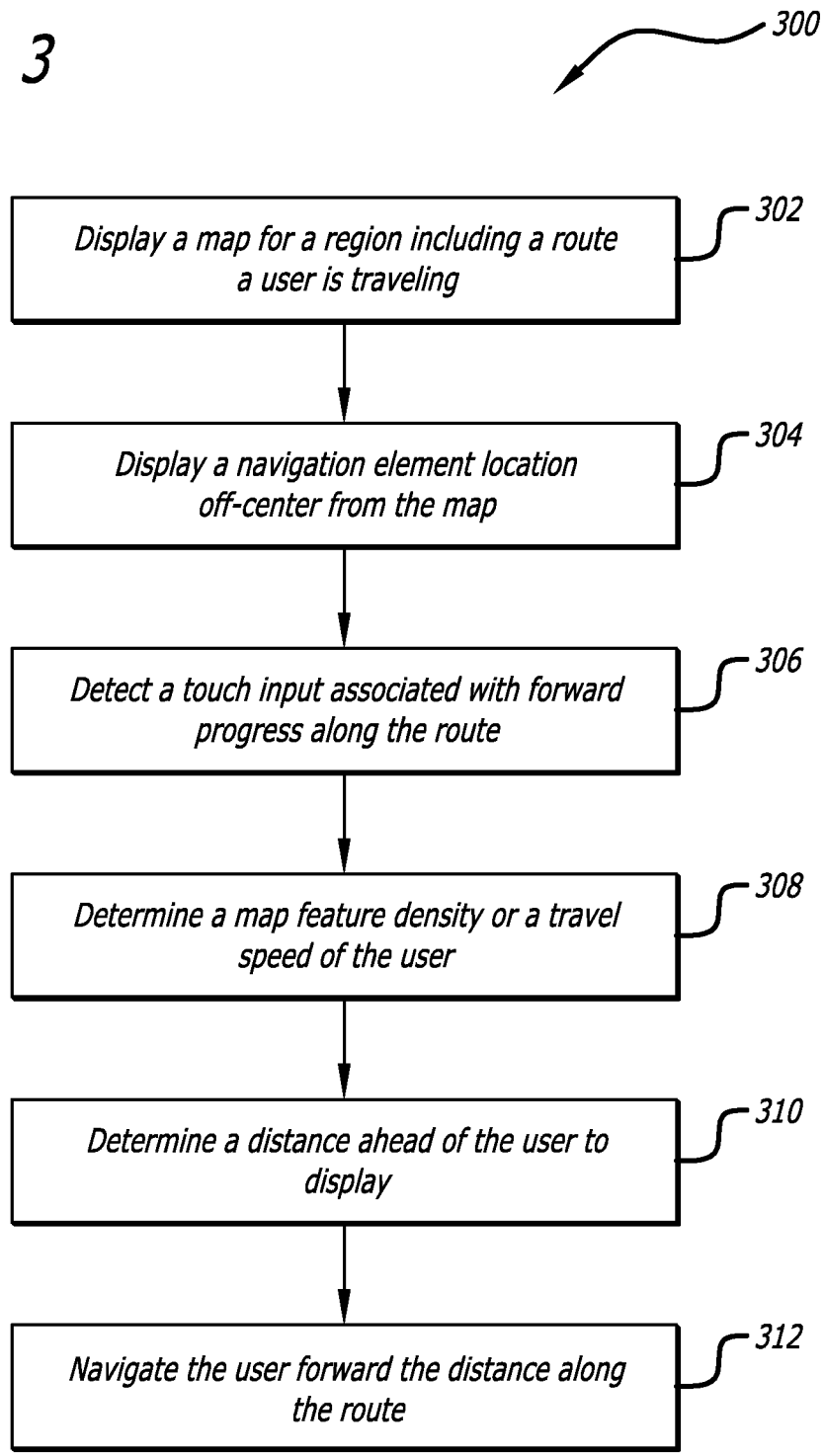

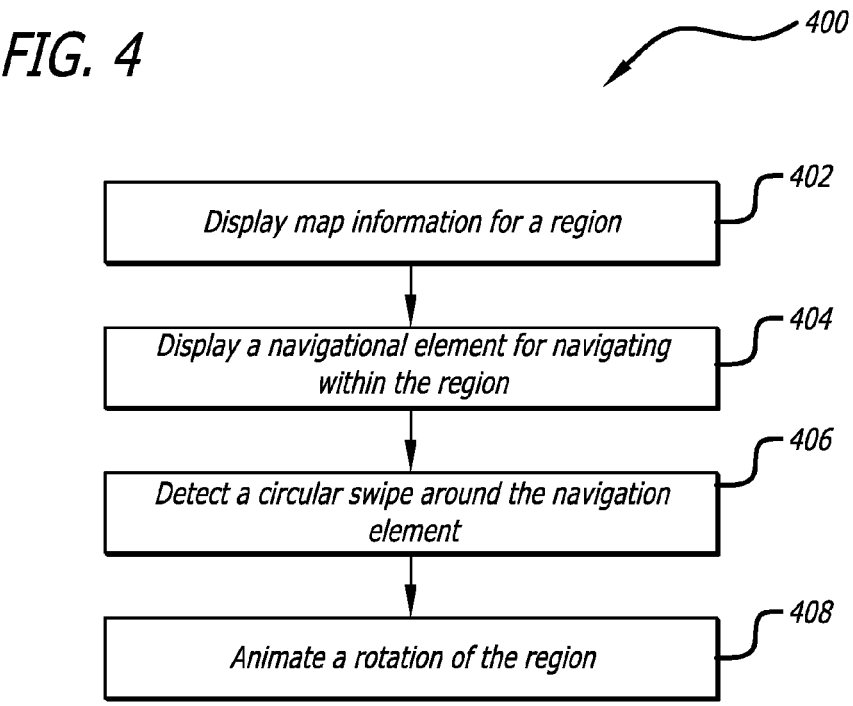
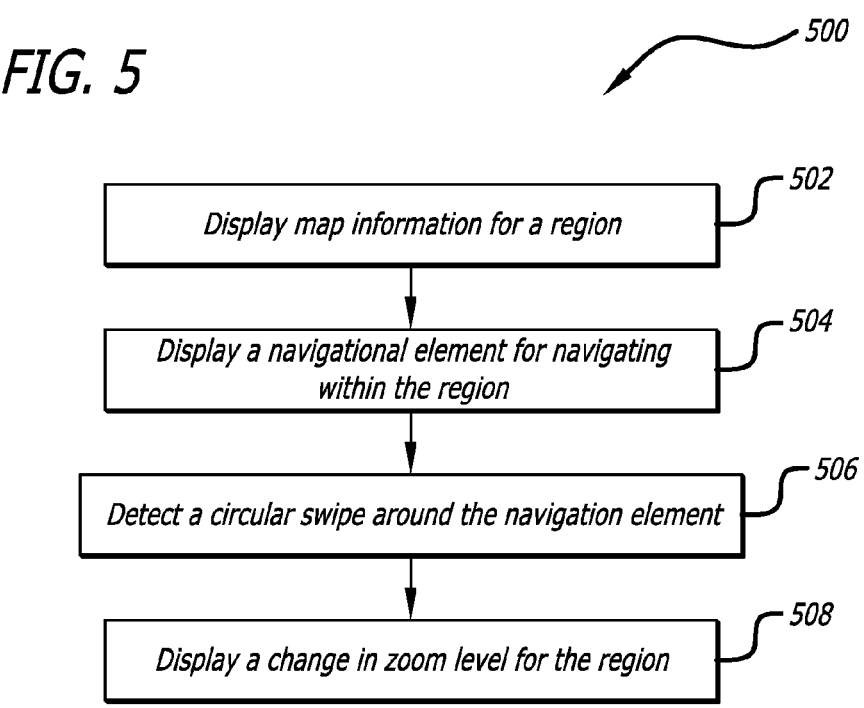

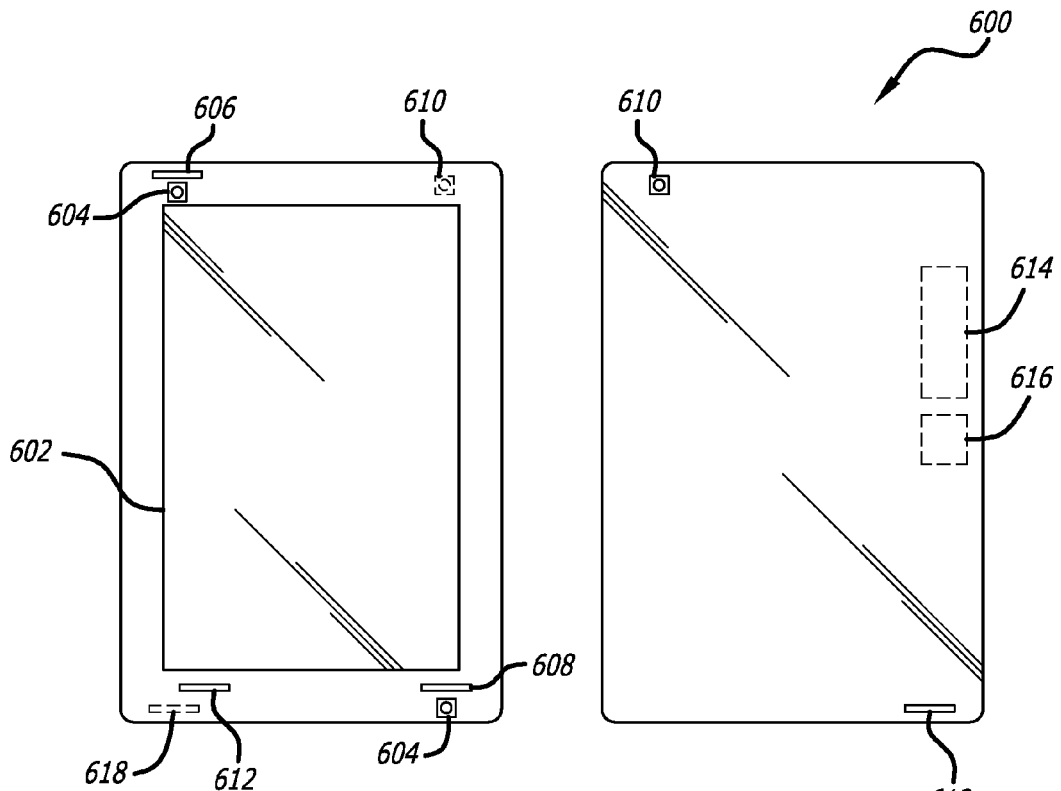
*FIG. 6A*  *FIG. 6B*
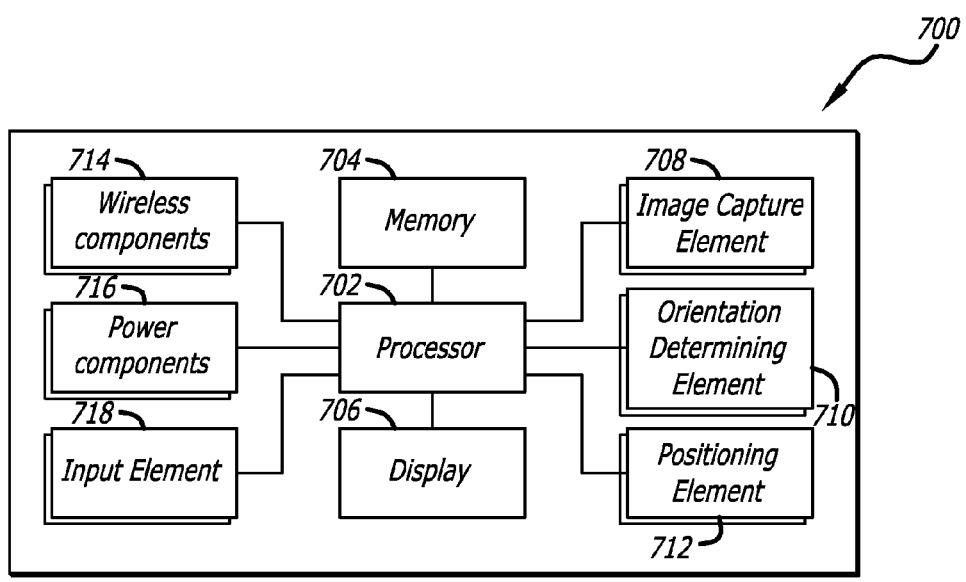
*FIG. 7*

CONTEXTUAL BASED NAVIGATION ELEMENT

BACKGROUND

Users are increasingly relying upon various electronic and computing devices to quickly handle various types of tasks. For example, many users rely upon computing devices to provide them with directions to a destination and assist them with navigation thereto from a mapping application. Users are able to control various functions of a mapping application on a touch display by swiping, dragging, or providing a two-finger pinch to move, rotate, and zoom, for example. For portable computing devices, such as smart phones or tablet computers, the screen size can be limited and these interactions often cause a user's hand to obscure a screen. Further, depending on a user's context or situation at a given time, it may not be convenient for the user to provide a particular gesture, such as a two-finger pinch. As technology advances and as people are increasingly using portable computing devices in a wider variety of ways, it can be advantageous to adapt the ways in which a computing device responds to a user's current context or situation and the ways in which users interact with the same.

BRIEF DESCRIPTION OF THE DRAWINGS

Various embodiments in accordance with the present disclosure will be described with reference to the drawings, in which:

FIG. 3 illustrates an example process that can be used in accordance with at least one embodiment;

FIG. 4 illustrates another example process that can be used in accordance with at least one embodiment;

FIG. 5 illustrates another example process that can be used in accordance with at least one embodiment;

FIGS. 6A and 6B illustrate an example computing device that can be used to implement aspects of various embodiments;

FIG. 7 illustrates example components that can be used with a device such as that illustrated in FIGS. 6A and 6B.

DETAILED DESCRIPTION

Figure 1A:
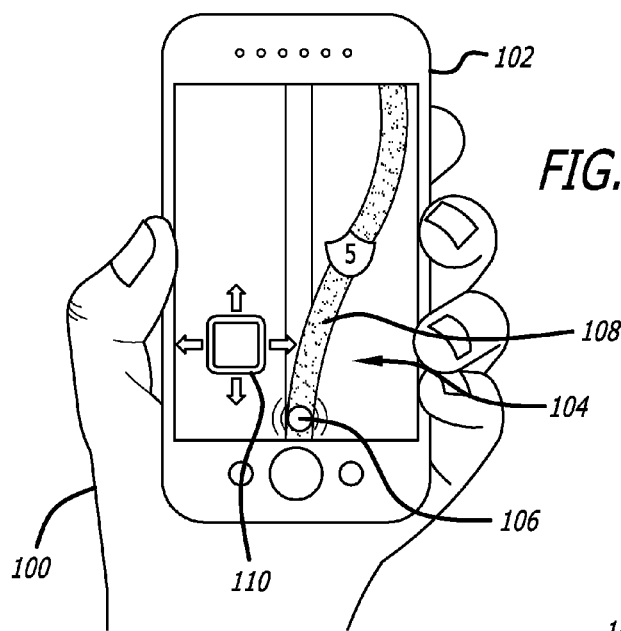
FIGS. 1A-1C illustrate an example set of views of a mapping application displayed on a computing device in accordance with at least one embodiment.

Systems and methods in accordance with various embodiments of the present disclosure may overcome one or more of the aforementioned and other deficiencies experienced in conventional approaches to enabling a user to interact with a computing device. In particular, various approaches enable a user to navigate within an application where features of the navigation vary depending on a context of the user or particular features of the application. For example, a user could request directions, in a turn-by-turn (TBT) mode of the computing device, to a destination. Accordingly, mapping information for a region and a route to the destination through the region can be displayed. Along with the mapping information, a navigation element or joystick can be displayed that enables the user to navigate through the mapping information. In one example, the navigation element is displayed off-center from the mapping information such that it does not obscure the mapping information while the user provides touch inputs to navigate within the same.

In at least one embodiment, upon detecting a touch input to the navigational element associated with forward movement along a route, the computing device can determine various features or variable associated with the route or the user as they are traveling along the route to adjust navigational sensitivity of the navigational element. In one example, mapping information along the route ahead of the user is analyzed to determine whether the mapping information is dense with features, such as intersections, highway off-ramps, businesses, points of interest, and the like. If the route ahead of the user is dense with features, the navigational sensitivity of the navigational element might be quite low since there is a lot of information for the user to consider when scrolling or navigating ahead. Conversely, if there are very few features, the navigational sensitivity can be adjusted to be relatively high, such that when the user navigates ahead, a larger distance within the mapping information is covered.

Further, a speed in which the user is traveling can also be taken into account when adjusting the navigational sensitivity of the navigational element. For example, if the user is traveling fast along a route, such as if they are traveling on a highway; they are probably not interested in street intersections that are not associated with off-ramps. Accordingly, the navigational sensitivity can be higher when the user is traveling at higher speeds and lower when the user is traveling at lower speeds. Additionally, a distance to a destination can also be taken into account when adjusting the navigational sensitivity of the navigational element. For example, if the user is a short distance away from their respective destination, the navigational sensitivity will be relatively low so the user does not overshoot or inadvertently navigate past the destination. Conversely, if the destination is a relatively long distance from the user, the navigational sensitivity can be higher in order to enable the user cover a larger distance more efficiently. Accordingly, the navigational sensitivity can be higher for large distances to a destination and lower for smaller distances. The travel speed and destination distance navigational sensitivities can also be utilized together in order to provide multiple navigational sensitivity thresholds.

In at least one embodiment, the navigational element is provided to enable to the user to perform various navigational commands with one hand and without obscuring or blocking the displayed mapping information with that hand. For example, the navigational element can be displayed off-center, such that it does not block a main portion or focal region of the mapping information, and in a location for the user to provide various touch inputs with, for example, their thumb. In one example, a user could provide a circular swipe around the navigation element to change zoom levels. A clockwise circular swipe could zoom in on a region and a counterclockwise swipe could zoom out. In another example, the circular swipe could rotate of the displayed mapping information. The navigational element could also operate as a virtual joystick where providing a touch input to a particular side of a virtual box or compass would result in a navigational movement in the associated direction.

Various other functions and advantages are described and suggested below as may be provided in accordance with the various embodiments.

Figure 1B:
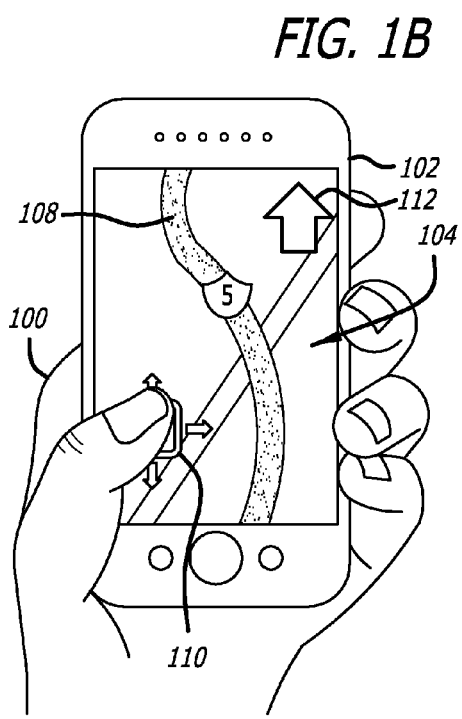
Figure 1C:
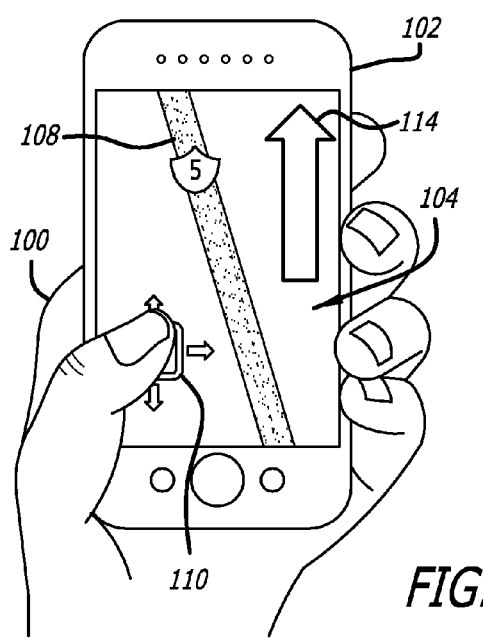

FIGS. 1A-1C show examples of context sensitive navigation within map 104 displayed on computing device 102 in accordance with at least one embodiment. In this example, user 100 may have request directions, in a turn-by-turn (TBT) mode of computing device 102, to a destination. FIG. 1A, in this example, shows user 100 holding computing device 102 with map 104 displayed on a touch display. In this example, map 104 includes route 108 and location indicator 106 that shows a current location of user 100 within map 104. Further, in this example, navigational element 110 is provided to enable user 100 to perform various navigational commands with one hand while not obscuring or blocking map 104. In at least one embodiment, user 100 can engage navigational element 110 to perform many, if not all, functions associated with a mapping application with a single hand by performing various touch gestures or motions with, for example, their thumb. Accordingly, the navigational element is displayed off-center, such that it does not block a main portion or focal region of map 104.

FIG. 1B shows user 100 providing a navigational touch input to an area of navigational element 110 corresponding to forward movement along route 108. In this example, providing a forward navigation input will navigate user 100 forward along route 108, regardless of whether route 108 curves or turns. Thus, in order to view an area of route 108 ahead of a currently location, user 100 can provide forward touch inputs until the desired location on route 108 is reached. Accordingly, in this example, user 100 has navigated forward from their location in FIG. 1A at a first distance corresponding to first navigational sensitivity 112 of navigational element 110. In at least one embodiment, upon detecting a touch input to navigational element 110, which, in this example, is associated with forward movement along route 110, computing device 102 may determine various features or variable associated with route 108 or user 100 as they travel along route 108 to adjust the navigational sensitivity of navigational element 110.

For example, mapping information along route 108 ahead of user 100 can be analyzed to determine whether map 104 is dense with features, such as intersections, highway off-ramps, businesses, points of interest, and the like. If a portion of route 108 ahead of user 100 is dense with such features, the navigational sensitivity of navigational element 110 may be quite low since there is a lot of information for the user to view or consider when scrolling or navigating ahead along route 108. If, however, there are few features, such as if the user is driving on a highway in the middle of a desert, the navigational sensitivity can be adjusted to be relatively high, such that when the user navigates ahead, a larger distance within the mapping information is covered for a single touch input.

Further, the speed that user 100 is traveling along route 108 can also be used to adjust sensitivity of navigational element 110. For example, if user 100 is traveling on a highway, they are probably not interested in street intersections or other details off the highway that are not associated with off-ramps or directions, so the navigational sensitivity can be higher. Conversely, if user 100 is traveling on side streets, they are more likely to be interested in a business or intersection within relatively close proximity and, therefore, the navigational sensitivity can be adjust downward so that user 100 does not overshoot their destination. Therefore, if user 100 is traveling fast along route 108, the navigational sensitivity can be higher and lower when user 100 is traveling at lower speeds.

Accordingly, FIG. 1B shows an instance where first sensitivity 112 (short arrow) is lower along route 108, which corresponds to a first movement or scroll distance upon receiving a forward touch to navigational element 110. In this example, first sensitivity 112 can be a result of features of a portion of route 108, such as an intersection shown therein or upon traveling through a city, or as a result of user 100 traveling at a lower speed along route 108. In another example, FIG. 1C shows an instance where second sensitivity 114 (long arrow) is higher along a portion of route 108, which corresponds to a second movement or scroll distance upon receiving a forward touch to navigational element 110. In this example, second sensitivity 114 could be a result of a lack of features along the portion of route 108 displayed in FIG. 1C or as a result of user 100 traveling at a high speed.

Accordingly, as discussed above for a user's travel speed, a distance to a destination can also be used to adjust the navigational sensitivity of the navigational element. For example, if the user is a short distance away from their desired destination, the navigational sensitivity will be relatively low to prevent the user from navigating past the destination. Similarly, if the destination is a relatively long distance from the user, the navigational sensitivity can be higher in order to enable the user navigate through a larger distance more efficiently. Accordingly, the navigational sensitivity can be higher for large distances and lower for smaller distances. The travel speed and destination distance navigational sensitivities can also be utilized together in order to provide multiple navigational sensitivities where each combination or permutation could navigate the user at a different navigation speed or distance on the displayed map.

Further, the navigational sensitivity or navigational speed at which a user is moved within the map application when proving an input could be broken up into a number of discrete speeds using distance, speed, and feature density thresholds. For example, under a first ground speed, a first distance to a destination, and first feature density, the user could be navigated at a first speed. In another example, under a first distance to a destination and first feature density, but between the first speed and a second speed, the user could be navigated at a speed. Accordingly, each of these variable could be associated with an individual threshold that factors into a navigational speed function. This function could also be simpler, such as having only two navigational speeds where a relatively slow speed is used until one of these variable becomes greater than a threshold to then boost the navigational speed to a second, relatively faster speed. Alternatively, the navigational speed could be a continuous range of navigational speeds that is determined as a function of each of the distance, speed, and feature density.

Figure 2A:
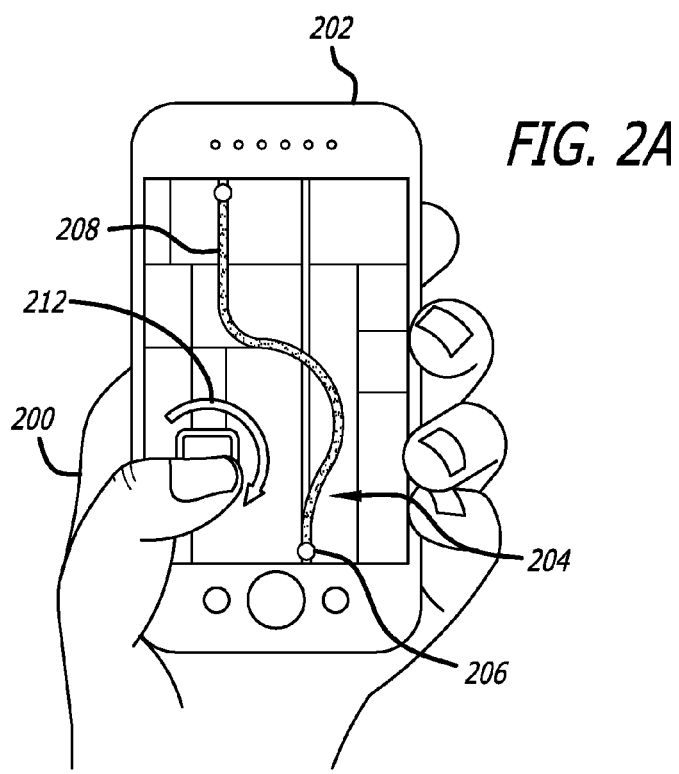
FIGS. 2A-2D illustrate another set of example views of a mapping application displayed on a computing device in accordance with at least one embodiment.
Figure 2B:
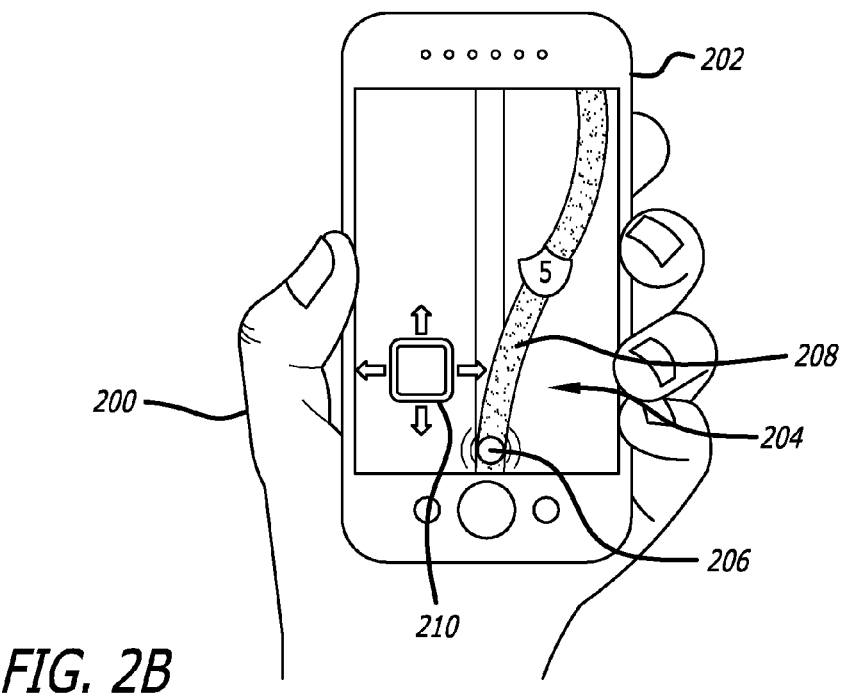
Figure 2C:
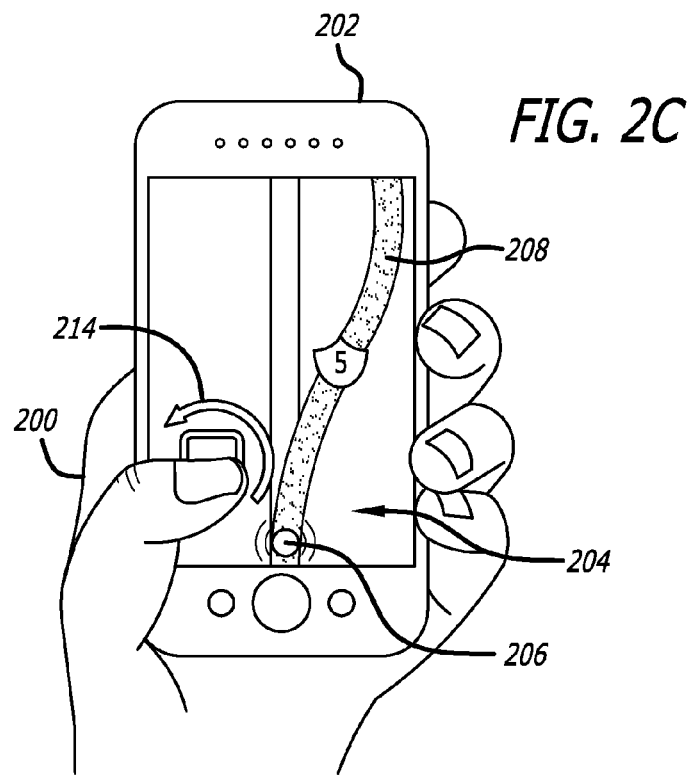
Figure 2D:
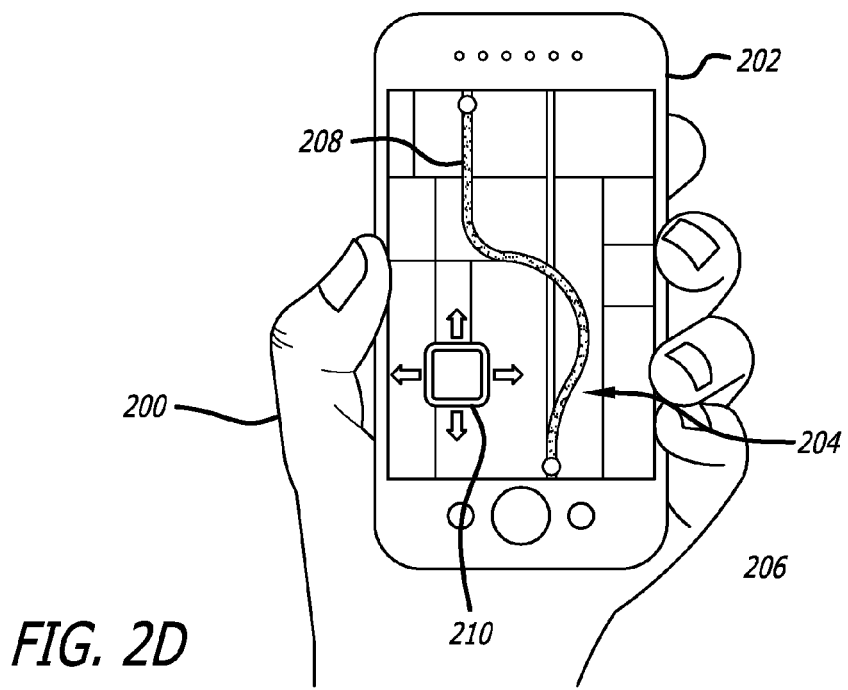

Various other features associated with a mapping application could also be initialed using various single finger hand gestures. For example, FIGS. 2A-2D show a zoom function that can be utilized within the scope of various embodiments. Similar to the example above, FIG. 2A shows user 200 holding computing device 202 that is displaying map 204. Further, user 200 has request TBT directions to a destination, which are displayed as route 208 on map 204. In this example, computing device 202 is displaying map 204 at a first (high) zoom level enabling user 200 to view their current location 206 and their destination along route 208. Accordingly, user 200, at the first (high) zoom level, has provided first circular swipe 212 substantially around navigational element 210 to zoom in to second (lower) zoom level, as shown in FIG. 2B. In this example, a circular swipe is a touch gesture made and registered as input on the surface of a touch display screen where a user substantially draws a circle with their finger on the display. Accordingly, FIG. 2C shows computing device 202 in the second (lower) zoom level as user 200 provides second circular swipe 214 substantially around navigational element 210 to zoom back out, as shown in FIG. 2D. In this example, first circular swipe 212 is substantially around navigational element 210 in the clockwise direction and second circular swipe 214 is in the counter clockwise direction. It should be understood that the direction of the circular swipe can be in either direction for either zoom in or zoom out and the chosen direction for FIGS. 2A-2D is for explanatory purposes only and is not to be considered limiting.

Various other features could also be associated with a circular swipe gesture. For example, a user could alternatively use the circular swipe to rotate their current view of a map. In at least one embodiment, a mapping application, in a TBT navigation mode, may display a map such that the forward direction of a route is always substantially at the 12:00 o'clock position of a display of the computing device regardless of turns or curves in the route. Accordingly, in this mode, a user could use the circular swipe gesture to rotate the map view and, thereby move the forward direction of the route away from the 12:00 o'clock position to navigate to a location off of the route while continuing on in the TBT navigation mode.

The navigational element, in at least one embodiment, can substantially operate as a virtual joystick where providing a touch input to a particular side of a virtual box or compass would result in a navigational movement in the associated direction. In at least one embodiment, the navigational element can be a miniature version of a current view of the map being displayed on the computing device. Accordingly, the user could move their finger within the miniature version of the map to navigate in a direction and display a corresponding portion of the map associated with the direction of movement of the user's finger. Accordingly, the navigational element, in accordance with at least one embodiment, can be a virtual context sensitive 'mini-map' Joystick UI control, that enables control of movement, such as pan, zoom, and re-center interactions within a mapping application. In this example, the navigational element could appear as a thumbnail sized graphical representation of the larger map that could have, in one example, context-sensitive arrows at the edges of the same. By integrating underlying map data, including routing data for a turn-by-turn navigation system, controls of the navigational element can be fine-tuned to a user's preferences, while allowing ease-of-use with their actual finger interactions. For example, if a current TBT route has a direction that is southeast, the navigational element could adjust the possible movement arrows to match the current path and, thereby, automatically expand the range interaction so that finger motion across a wider range (down and/or right) would send the appropriate event to a hosting application.

FIG. 3 illustrates an example process 300 that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, mapping information for a geographic is displayed 302. Further, the mapping information also includes a route through the region along which the computing device is traveling. In this example, a navigation element is displayed in a location off-center from the mapping information for the geographic region 304. In this example, a touch input associated with forward progress along the route is detected 306. In this example, a map feature density along the route ahead of the user or a travel speed of the computing device moving along the route is determined 308. Based at least in part on the map feature density or the travel speed, a distance ahead of the user to display is determined 310. Accordingly, the user is navigated 312 forward the distance along the route.

In at least one embodiment, upon entering a TBT navigation mode for the route from a standard or default map view, map feature density could be reduced from displaying a first amount of map information to omit map features that are substantially unassociated with the route to display a second amount of map information. For example, streets that do not include onramps or off-ramps along a route on a highway could be omitted to make more useful or relevant information (i.e., streets with onramps or off-ramps) easier for a user to identify or track. In another example, a user might search for a gas station near their current location and businesses other than gas stations displayed on the map could disappear from view in order to enable the user to more readily identify their location(s).

FIG. 4 illustrates an example process 400 that can be used in accordance with various embodiments. In this example, map information for a region is displayed 402. In this example, a navigational element for navigating within the region is displayed 404. In this example, a circular swipe around the navigation element is detected 406. In response to detecting the circular swipe, a rotation of the map information for the region is animated 408. For example, in a mapping application, a TBT navigation may display a route such that the forward direction of the route is substantially at the 12:00 o'clock position of a display of the computing device regardless of turns or curves in the route. In this example, the display of the computing device could follow the route (or a general direction of user travel when not in a TBT mode) from a perspective of a user driving along the route. Accordingly, a user could use the circular swipe gesture to rotate the map view and, thereby move the forward direction of the route away from the 12:00 o'clock position to navigate to a location off of the route while continuing on in the TBT navigation mode, as discussed above.

FIG. 5 illustrates an example process 500 that can be used in accordance with various embodiments. In this example, map information for a region is displayed 502. In this example, a navigational element for navigating within the region is displayed 504. In this example, a circular swipe around the navigation element is detected 506. In response to detecting the circular swipe, a change in zoom level for the region is displayed 508.

In at least one embodiment, upon receiving a navigational touch input and navigating a user in a direction, the path of navigation could become curved or attracted towards map features, such as points of interest or map search results for a business displayed in a map application, for example. In this example, the path of navigation could be attracted to these map features as if the map features have gravity and a gravity weighting associated therewith. Accordingly, if a user navigates in a direction they will be navigated in a direction associated with a map feature that could be of interest to them. Further, the closer the path of navigation to a map feature point or a set of features, the greater an attraction between the path and a map feature could become. Accordingly, a level of attraction between the path and a map feature could be a function of distance.

In at least one embodiment, the navigational element could change a side of the computing device on which it is displayed. For example, if the user is holding the computing device in their right hand, the navigational element could be displayed off-center to the right. Similarly, if the user is holding the computing device in their left hand, the navigational element could be displayed off-center to the left. This can be achieved by capturing image information of the user using one or more user facing cameras of the computing device and using the image information to determine whether the user is holding the computing device in their right hand or left hand based on the relative location of the user in the captured image information. Accordingly, upon determining that the user is holding the computing device in the right hand, the navigational element off-center is displayed on a right side of the computing device and displayed on the left side of the display upon determining that the user is holding the computing device in their left hand.

Further, it should be understood the navigational element, gestures associated therewith, and user and/or surface/application context considerations are not limited to a mapping application. For example, the navigational element could be used to navigate along a zoomed-in view of an image, painting, or any other surface. In this example, color or pixel intensity or gradients are similar to the map features. In this example, a surface, such as an image, having at least one feature, such as color or pixel intensity gradients, could be displayed on the display of a computing device. The navigation element, in this example, can be displayed off-center from the surface enabling a portion of the surface to be displayed while enabling touch inputs to be provided to the navigation element. Accordingly, navigation around the surface of the image can be achieved using the navigation element and a navigational sensitivity of the navigational element could be associated with a function of a density of the color or pixel intensity gradient in a direction of the image. Further, as described above, a gravity could be associated with the color or pixel gradients, thereby, slightly curving a path of navigation toward interesting aspects of the image, such as faces.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
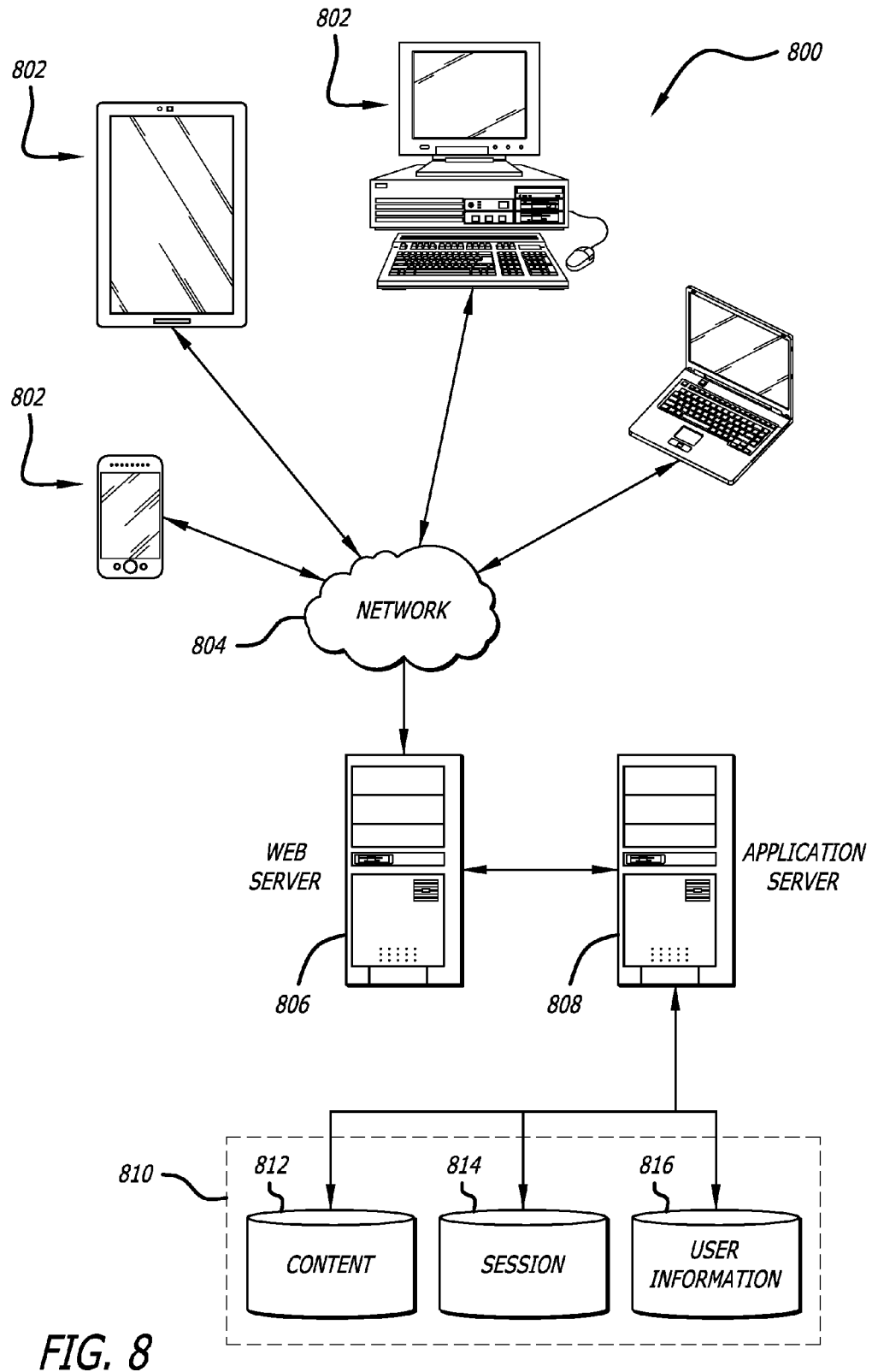
FIG. 8 illustrates an environment in which various embodiments can be implemented.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a processor;
   a touch display; and
   a memory including instructions that, when executed by the processor, cause the computing device to:
   display, on the touch display of the computing device, mapping information for a geographic region proximate the computing device, the mapping information including a route through the region along which the computing device is traveling;
   display an interactive navigation element on the touch display, the interactive navigation element being displayed in a location offset from the route allowing a user to view a portion of the mapping information for the region while
   providing a touch input to navigate along the route through the region;
   detect the touch input to the interactive navigation element, the touch input associated with forward movement along the route;
   determine a navigational sensitivity of the interactive navigation element, based at least in part on at least one of a map feature density along the route ahead or a travel speed of the computing device moving along the route;
   determine a distance ahead on the route to navigate the display of the mapping information based at least in part on the navigational sensitivity of the interactive navigation element; and
   update the display of mapping information in order to navigate forward along the route by the determined distance.

2. The computing device of claim 1, wherein the instructions, when executed by the processor, further enable the computing device to:
   upon receiving a substantially circular swipe around the interactive navigation element, display at least one of a change in zoom level or a rotation of the displayed mapping information.

3. The computing device of claim 1, wherein the interactive navigation element is a miniature view of the displayed mapping information for the region and, wherein a location of the interactive navigation element changes depending on a hand in which the user is holding the computing device.

4. The computing device of claim 1, wherein the distance along the route is longer when the map feature density is low and shorter when the map feature density is high.

5. The computing device of claim 4, wherein the map feature density is associated with at least one of a number of intersections, points of interest, highway off-ramps, or urban development.

6. A computer-implemented method, comprising:
   under the control of one or more computer systems configured with executable instructions,
   displaying, on a touch display of a computing device, a map surface having at least one map feature;
   displaying, on the touch display, an interactive navigation element off-center from the map surface enabling a portion of the map surface to be displayed while enabling touch inputs to be provided to the interactive navigation element;
   enabling navigation around the map surface using the interactive navigation element, a navigational sensitivity of the interactive navigation element being a function of a density of the at least one map feature in a direction along the surface.

7. The computer-implemented method of claim 6, wherein the navigational sensitivity is associated with a distance covered in the direction upon receiving a navigational touch input, the distance covered being longer when the density of the at least one feature is low and shorter when the density of the at least one feature is high.

8. The computer-implemented method of claim 7, wherein the direction along the surface is a route on the map, and the at least one feature is associated with at least one of a number of intersections, points of interest, highway off-ramps, or urban development.

9. The computer-implemented method of claim 8, further comprising:
   determining at least one of a speed of the computing device traveling or a distance to a destination associated with the route; and
   based at least in part on at least one of the determined speed or distance to the destination, adjusting navigational sensitivity of the interactive navigation element, the distance covered being longer at higher travel speeds and longer distances to the destination relative to lower travel speeds and shorter distances to the destination relative.

10. The computer-implemented method of claim 6, further comprising:
    upon receiving a navigational touch input, displaying map information associated with navigating a direction along the map surface associated with the received navigation input, the direction having a gravity weighting associated with movement toward one or more features of the at least one map feature upon approaching the one or more map features.

11. The computer-implemented method of claim 10, wherein the at least one feature is at least one of map location search results or points of interests.

12. The computer-implemented method of claim 6, further comprising:
    upon entering a turn-by-turn navigation mode for a route, reducing density of the at least one map feature to omit map features substantially unassociated with the route.

13. The computer-implemented method of claim 6, further comprising:
    receiving a substantially circular swipe input around the interactive navigation element; and
    displaying at least one of a change in zoom level or a rotation of the displayed map surface.

14. The computer-implemented method of claim 6, further comprising:
    capturing image information of a user using at least one user facing camera of the computing device;
    determining whether the user is holding the computing device in a right hand or a left hand based on a relative location of the user in the captured image information; and
    upon determining that the user is holding the computing device in the right hand, displaying the interactive navigation element off-center on a right side of the touch display; and upon determining that the user is holding the computing device in the left hand, displaying the interactive navigation element off-center on a left side of the touch display.

15. A non-transitory computer-readable storage medium storing instructions that, when executed by at least one processor, cause a computing device to:

display mapping information on a touch display of a computing device;

display an interactive navigation element on the touch display, the interactive navigation element being displayed off-center from the mapping information; and enable navigation within the mapping information using the interactive navigation element;

determine a speed of the computing device traveling within the mapping information; and based at least in part on the determined speed, determining a navigational sensitivity of the interactive navigation element, the navigational sensitivity being higher at higher user travel speeds and lower and lower user travel speeds.

16. The non-transitory computer-readable storage medium of claim 15, wherein the navigational sensitivity is associated with a distance covered within the mapping information upon receiving a navigational touch input, the distance covered being longer at higher travel speeds and shorter at lower travel speeds.

17. The non-transitory computer-readable storage medium of claim 15, wherein the instructions that, when executed by the at least one processor, further cause the computing device to:

receive a navigational touch input; and navigate the user in a direction associated with the navigational touch input a distance within the mapping information according to the determined navigational sensitivity.

18. The non-transitory computer-readable storage medium of claim 15, wherein the instructions that, when executed by the at least one processor, further cause the computing device to:

receive a substantially circular swipe input around the interactive navigation element; and display at least one of a change in zoom level or a rotation of the displayed mapping information.

19. The non-transitory computer-readable storage medium of claim 15, wherein the interactive navigation element is a miniature view of the displayed mapping information.

20. The non-transitory computer-readable storage medium of claim 15, wherein the instructions that, when executed by the at least one processor, further cause the computing device to:

capture image information of the user using at least one user facing camera of the computing device;

determine whether the user is holding the computing device in a right hand or a left hand based on a relative location of the user in the captured image information; and upon determining that the user is holding the computing device in the right hand, display the interactive navigation element off-center on a right side of the touch display; and upon determining that the user is holding the computing device in the left hand, display the interactive navigation element off-center on a left side of the touch display.

* * * * *